UNITED STATES PATENT OFFICE.

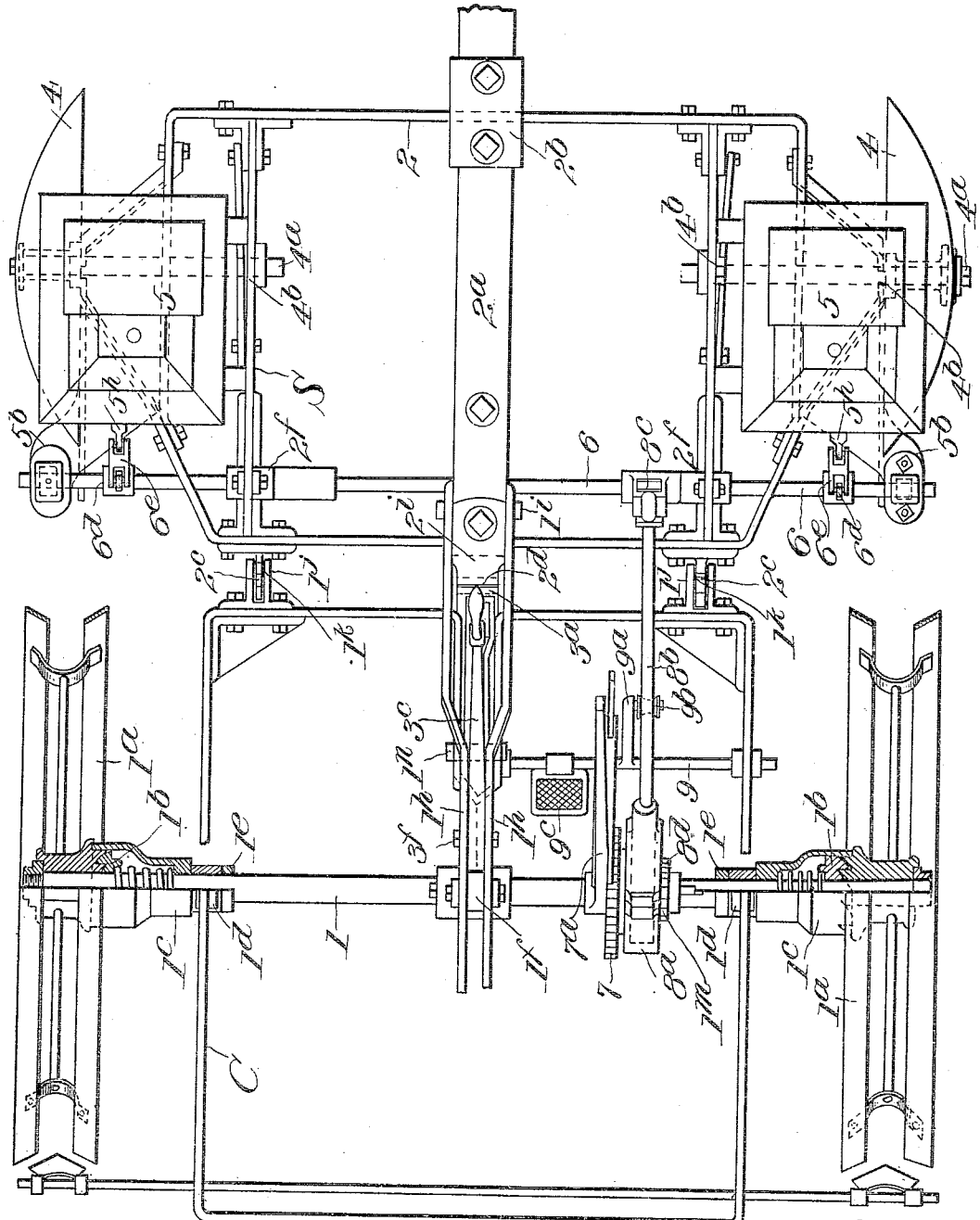

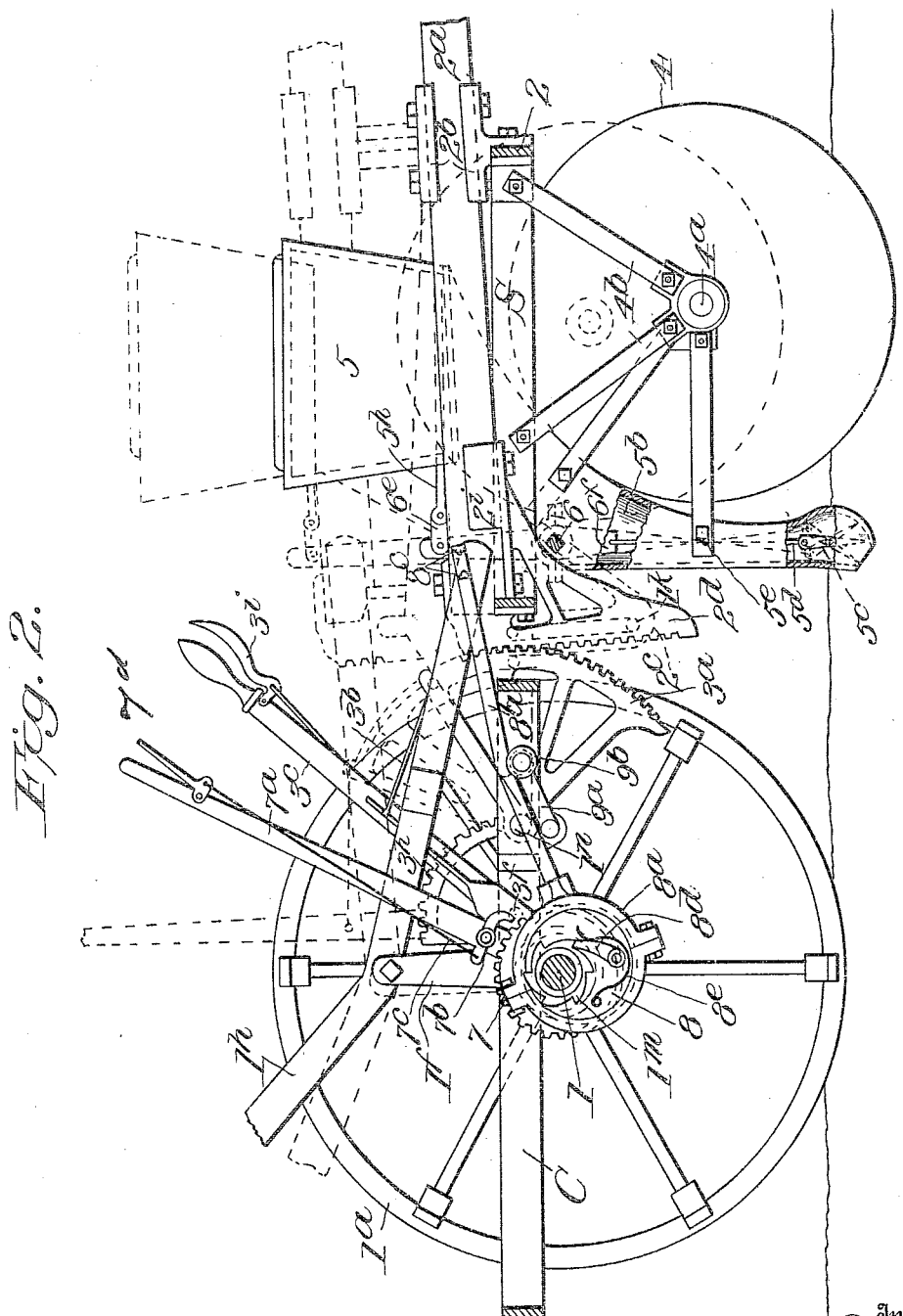

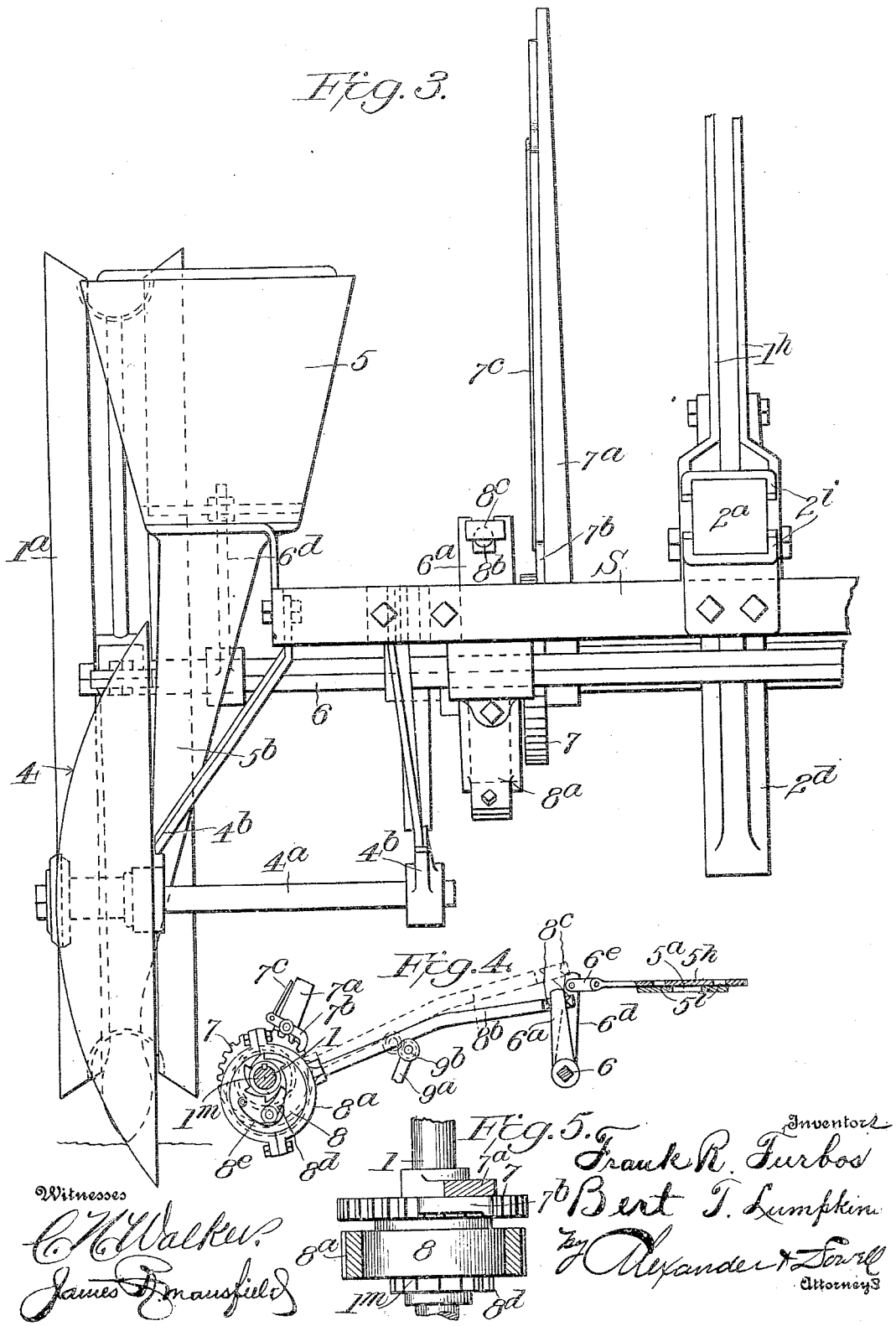

FRANK R. FURBOS AND BERT T. LUMPKIN, OF ROCK ISLAND, ILLINOIS.

PLANTER.

953,604.

Specification of Letters Patent.  Patented Mar. 29, 1910.

Application filed May 26, 1909.  Serial No. 498,459.

*To all whom it may concern:*

Be it known that we, FRANK R. FURBOS and BERT T. LUMPKIN, both of Rock Island, county of Rock Island, and State of Illinois, have invented certain new and useful Improvements in Planters; and we hereby declare that the following is a full, clear, and exact description thereof, reference being had to the accompanying drawings, which form part of this specification.

This invention is an improvement in seed planting machines, and is especially designed for planting corn or grain in hills, at regular intervals apart; and its object is to provide a machine which will do this kind of work accurately without the use of a check-row wire, and wherein the seed plates can be operated by means of an eccentric, and means are provided for throwing the seeding devices into or out of operation at the will of the operator; and whereby after the seeders have been thrown out of operation at the end of a row, and the machine has been turned,—the eccentric can be manually shifted so as to insure operation of the seeding devices at the proper time, and accurate registration or alinement of the hills in the next row to be planted with the hills in the preceding rows. Means are also provided whereby the furrow opening devices can be raised clear of the ground when the machine is being turned, or driven over roads or across fields, and whenever it is not desired to operate the same.

The parts and combinations of parts for which protection is desired will be set forth in the claims appended to the following description of the machine illustrated in the accompanying drawings which illustrate a machine designed and adapted for use as a corn planter, but the invention can be easily adapted for planting other grains or seeds in hills.

In said drawings—Figure 1 is a top plan view of the complete machine partly broken away and partly in section. Fig. 2 is a side elevation of such machine, partly in section, showing the planting devices in operative position in full lines, and in transport position in dotted lines. Fig. 3 is an enlarged detail front end elevation of part of the machine. Fig. 4 is a detail sectional view of the eccentric devices and connections for operating the seed feed plates, and for shifting the eccentric. Fig. 5 is an enlarged detail sectional view of the eccentric adjusting devices.

The machine comprises a wheel or carrying frame C and a front or runner seeding frame S, which are flexibly jointed together as hereinafter described. The carrying frame C is mounted on an axle 1 supported by wheels $1^a$ which are preferably rotatably journaled on the ends of axle 1 and may be locked thereto by means of any suitable clutch devices—indicated at $1^b$ in Fig. 1, so arranged that when the machine moves forward the wheels will turn the axle in a forward direction, but if the machine is moved backward the wheels may turn idly on the axle 1; nothing is claimed herein for this method of mounting the wheels, as it is old.

The carrying frame C is preferably formed of bar-iron bent into angular form, and arranged edgewise, and connected to sleeves $1^d$ on the axle adjacent the inner ends of the hubs, or clutch casings $1^c$, of the wheels, and kept from lateral movement on the axle by collars $1^e$ pinned thereto. A standard $1^f$ is attached to the axle about centrally of the frame, and to this standard are attached seat carrying levers $1^h$, to the rear end of which is attached the driver's seat— not shown; and the forward ends of these levers are pivotally connected to a bolt $1^i$ engaging one of the tongue clamp brackets $2^i$ on the seeding frame.

The seeding frame S is of oblong shape and preferably made of metal-bars 2 arranged vertically edgewise; the tongue $2^a$ is attached centrally to said frame by means of clamp plates $2^i$, $2^b$, as shown; and on the outer ends of the frame 2 are mounted furrow openers 4 and seed boxes 5, as hereinafter explained. To the rear corners of the frame 2 are attached vertically disposed slotted guide plates $2^c$ which are embraced between bifurcated brackets $1^j$, attached to the front members of the frame C, and provided with pins $1^k$ transfixing the slots in the plates $2^c$. These pins $1^k$ may be provided with rollers if desired. Said guide plates and brackets prevent lateral displacement of the frames C and S, and form a loose connection between the same which permits the seeding frame S to be raised and lowered relatively to the carrier frame C. To the rear bar of frame S is attached a segment 2$^d$, which is somewhat longer than the slotted guide plates 2$^c$, and meshes with a segment 3$^a$ which is pivoted on frame C, as shown at 1$^n$; and the upper end of segment 3$^a$ is pivotally connected by a link 3$^b$ with a lever 3$^c$ which is pivoted on frame C, as shown at 3$^f$, beside a segment 3$^h$ fast to frame C; and lever 3$^c$ is provided with a hand latch 3$^i$ of ordinary construction adapted to engage the segment 3$^h$ and lock lever 3$^c$ in any position to which it is adjusted. When lever 3$^c$ is thrown forwardly segment 3$^a$ is lowered, and thus the seeding frame S can be lowered to operative position, as indicated in full lines Fig. 2; but by drawing lever 3$^c$ back the seeding frame S can be raised to the position indicated in dotted lines in Fig. 2, with the furrow opening devices and seed spouts clear of the ground, in which position the parts are ready for transportation. The lever 3$^c$ is located in easy reach of the driver.

Any suitable furrow openers can be used, but we preferably employ disk furrow openers 4, which are mounted on shafts 4$^a$ journaled in brackets 4$^b$ suspended from the ends of the frame S, as shown; and above the furrow openers are mounted seed boxes 5 of any suitable kind and supported on the frame S, as indicated in the drawings.

Each seed box has a feed opening 5$^a$ in its bottom which connects with a feed spout 5$^b$ that extends down behind the adjacent furrow opener 4 in position to deliver the seed into the furrow; and in the lower end of each seed spout we preferably use a pivoted drop plate 5$^c$, which may be operated by a rod 5$^d$ pivoted in the spout as shown at 5$^e$, and have its upper end loosely engaged by a crank arm 6$^f$ on a rock-shaft 6 mounted in brackets 2$^f$ attached to frame S as shown. In each seed box 5 is a reciprocating feed plate 5$^h$ provided with two feed openings 5$^i$ which are adapted to alternately register with the feed opening 5$^a$ as the slide is reciprocated; this feed slide 5$^h$ is connected by a link 6$^e$ to a frame 6$^d$ on the rock shaft 6; and this shaft 6 is rocked by an eccentric device which we will now describe and which forms the principal feature of the present invention. On shaft 6 is fixed an upstanding arm 6$^a$, the upper end of which is preferably slotted as shown for engagement with the forward end of a pitman-rod 8$^b$ which is connected to an eccentric strap 8$^a$ surrounding the eccentric 8$^b$ loosely mounted upon the axle 1 in the carrier frame. The forward end of pitman 8 is preferably provided with two transversely projecting portions 8$^c$ between which the upper slotted end of arm 6$^a$ is embraced, so that when the rod is reciprocated arm 6$^a$ will be vibrated and the shaft 6 consequently rocked once back and forth for each rotation of the eccentric 8, which is of a diameter and eccentricity sufficient to give the desired amount of throw to the rock shaft.

On the axle 1 beside the eccentric 8 is keyed a ratchet 1$^m$ whose teeth point forwardly, or in the direction of rotation of axle 1; and the eccentric 8 is locked to said ratchet 1$^m$ during the forward rotation of the shaft by means of a dog 8$^d$ pivoted on the eccentric and normally held in engagement with the ratchet 1$^m$ by means of a spring 8$^e$. Of course if the shaft should rotate backward the eccentric would not be operated. By the means thus far described it will be seen that when the machine is moved forwardly and the rod 8$^b$ is in engagement with arm 6$^a$ the feed slides will be reciprocated, and two hills of seed be dropped at a uniform distance apart for each rotation of axle 1.

In order to enable the eccentric to be adjusted so as to drop the first hill in a row at any desired point, we provide the following means: Fast to the eccentric 8 is a gear 7, which is loosely mounted on axle 1 at the side of the eccentric opposite ratchet 1$^m$; a hand lever 7$^a$ is pivoted on the axle 1 beside the gear 7 and on this lever is mounted a pivoted dog 7$^b$ which is adapted to be engaged with the teeth of gear 7 but is normally held out of engagement therewith by means of a rod 7$^c$ pivoted to the tail of the dog and to the hand piece 7$^d$ onto lever 7$^a$. If it should be desired to shift the position of the eccentric relative to axle 1 at any time, the machine is stopped and the operator locks the lever 7$^a$ to the gear 7 by dog 7$^b$, and then by shifting lever 7$^a$ can shift gear 7 forward or backward on axle 1, and thus shift the position of eccentric 8 forward or backward and move the seed slides 5$^h$ forward or backward. He can thus cause the feed slides to deliver the seed at any desired point; and then by releasing the lever 7$^a$ and disengaging the dog 7$^b$ from gear 7 the seed plate will thereupon be operated by the eccentric, driven by the axle 1 at the proper time. In this way the operator, in starting a row, can plant the first hill of seed at any predetermined point; and the subsequent hills will be planted at regular distances apart.

In order to prevent operation of the feed slides while the machine is being turned or transported, or while being adjusted to get the seed droppers into position at the beginning of a row, the pitman rod 8$^b$ may be readily disconnected from the slotted arm 6$^a$ by means of a crank arm 9$^a$ mounted on a rock-shaft 9 journaled in frame C as shown and carrying a roller 9$^b$ on its outer end adapted to engage the under side of rod 8$^b$; and the shaft 9 may be rocked by means of a foot lever 9$^c$, attached thereto, so as to swing the support 9$^b$ upward against the under side of rod 8$^b$ and raise said rod so as to disengage its end 8ᶜ from crank arm 6ᵃ, and hold it disengaged so long as the operator keeps lever 9ᶜ depressed by his foot.

The operation of the parts is as follows: While the machine is in transport the parts are in position indicated in dotted lines Fig. 2, so the furrow openers and seed spouts are raised above the surface of the ground, and the rod 8ᵇ is disengaged from the arm 6ᵃ. When ready for use the seed frame is lowered to the position indicated in full lines Fig. 2 so that the disk 4 will open a furrow, and when brought to the proper position for starting a row, rod 8ᵇ is engaged with arm 6ᵃ, and the operator then shifts eccentric 8 by means of hand lever 7ᵃ as described, until the first hill of seed is dropped. The position of this first hill may be indicated by a suitable marker. The machine is then driven across the field to the end of the row and the last hill dropped in such row may also be indicated by a suitable marker; the rod 8ᵇ is then disengaged from the arm 6ᵃ and the machine turned into position for the next row. After the seed droppers are brought into alinement with the marker the operator reëngages the rod 8ᵇ with the arm 6ᵃ and then shifts the eccentric by lever 7ᵃ until the first hill of seed is dropped, and then proceeds across the field on the return row. In this simple way all the rows planted by the machine will be in exact alinement so that the crop can be easily cultivated. No seed is wasted by accumulation of droppings at the ends of the rows, because none need be dropped until the machine has been brought into exact position; and by reason of the provision of means for manipulating the eccentric by hand the first hill in each row can be planted in exact position, and of course if the first hills are properly located the subsequent ones will be. The grain can be planted in any depth of furrow desired by adjusting the position of the seeder frame relative to the main frame by means of lever 3ᶜ, segments 3 and 2ᵈ. The weight of the operator sitting upon the seat assists in the raising of the seeder frame. The machine can be used for drilling seed if desired by simply disconnecting the dropper plate 5ᵉ and by substituting for the feed plate 5ʰ with two holes, a feed plate having a great number of holes so that the seed will be drilled instead of merely planted in hills. In such cases a longer rocker arm 6ᵈ may be employed to get a quicker longer throw of the seed plate.

Having described our invention what we claim as new and desire to secure by Letters Patent thereon is:

1. In a planter the combination of a driven shaft or axle, a gear loosely mounted thereon, an eccentric fast to said gear, means for locking the eccentric and gear to the axle; and a lever and connections for shifting said gear and eccentric rotatably on the axle, independent of the clutch devices; with seeding devices, means for operating said seeding devices from the eccentric, and manually operable means for disconnecting the said operating means from the seeding devices.

2. In a planter the combination of a main axle, wheels for operating said axle, an eccentric loosely mounted on said axle, a gear fastened to said eccentric but concentric to the axle, a lever loosely mounted on the axle adjacent said gear, and means for locking said lever to said gear whereby the eccentric may be adjusted rotatably on the axle, and means for locking the eccentric to the axle; with seeding devices, and connections for operating these devices from said eccentric.

3. In a planter the combination of a main axle, wheels for operating said axle, an eccentric loosely mounted on said axle, a gear fastened to said eccentric but concentric to the axle, a lever loosely mounted on the axle beside said gear, means for locking said lever to said gear whereby the eccentric may be adjusted rotatably on the axle; and a clutch for locking the eccentric to the axle in one direction; with a seed frame, seed boxes thereon, a rock shaft, and connections for operating the seed devices, and connections for operating the rock shaft by and from said eccentric.

4. In a planter the combination of a carrier frame, a wheeled axle supporting the same, an eccentric loose on the axle, a ratchet fixed to the axle, and a pawl engaging said ratchet and connected with said eccentric; with a seeder frame, a seed box thereon, a furrow opener, and seed dropping tube behind the furrow opener; a rock shaft on the seeder frame, connections for operating the feed devices from said rock shaft, and connections between said rock shaft and the eccentric.

5. In a planter the combination of a carrier frame, a wheeled axle supporting the same, an eccentric loose on the axle, a ratchet fixed to the axle, and a pawl engaging said ratchet and connected with said eccentric; with seed boxes, feed devices therein, furrow openers, seed dropping tubes behind the furrow openers, a rock shaft, connections for operating the feed devices from said rock shaft, and detachable connections between said rock shaft and the eccentric.

6. In a planter the combination of a carrier frame, a wheeled axle supporting the same, an eccentric on the axle, means for locking the eccentric to the shaft, and means whereby the eccentric may be rotatably shifted on said axle; with seed boxes, furrow openers, seed dropping tubes behind the furrow openers, a rock shaft, connections for operating said feeding devices from said rock shaft, detachable connections between said rock shaft and the eccentric, and means whereby said connections may be disengaged from said shaft.

7. In a planter the combination of a carrier frame, a wheeled axle supporting the same, an eccentric on the axle, means for locking the eccentric to the axle in one direction, and means whereby the eccentric may be rotatably shifted on said axle; with a seeder frame, seed boxes thereon, furrow openers, seed dropping tubes behind the furrow openers; a rock shaft on the seeder frame, connections for operating the said feeding devices from said rock shaft, an arm on said rock shaft, detachable connections between said arm and the eccentric, and means whereby the eccentric may be disengaged from the rock shaft.

8. In a planter the combination of a carrier frame having a main wheeled axle, a seeding frame having furrow openers and seed boxes hingedly connected with the main frame, a rock shaft mounted on the seeder frame and connections for operating the said feeding devices from said rock shaft; with an eccentric on the main axle, an eccentric strap, a rod connected with said strap and having a headed end, and a crank arm on said rock shaft having a slotted end engaged by the headed end of said rod, and means for disengaging said rod from said arm.

9. In a planter the combination of a carrier frame having a main wheeled axle, a seeding frame having furrow openers and seed boxes hingedly connected with the main frame, a rock shaft mounted on the seeder frame and connections for operating the said feeding devices from said rock shaft; with a rotatably adjustable eccentric on the main axle, an eccentric strap, a rod connected with said strap, a crank arm on said rock shaft detachably connected to said rod, and manually operated means for disengaging the rod from said crank shaft.

10. In a planter the combination of a carrier frame having a main wheeled axle, a seeding frame having furrow openers and seed boxes hingedly connected with the main frame, a rock shaft mounted on the seeder frame, and connections for operating the seeding devices from said rock shaft; with an eccentric on the main axle, an eccentric strap, a rod connected with said strap, a crank arm on said rock shaft detachably engaged by said rod, and means for disconnecting said rod from said crank arm and holding it out of engagement therewith.

11. In a planter the combination of a carrier frame having a main wheeled axle, a seeding frame having furrow openers and seed boxes hingedly connected with the main frame, a rock shaft mounted on the seeder frame, and connections for operating the seeding devices from said rock shaft; with an eccentric loosely mounted on the axle, means for rotatably adjusting the eccentric on the axle, a clutch for normally locking the eccentric to the axle, an eccentric strap, a rod connected with said strap, a crank arm on said rock shaft, and means for detachably connecting said rod to said crank arm.

12. In combination a carrier frame, a wheeled axle supporting the same, seeding boxes, and a rock shaft and connections for operating said devices and an arm on said rock-shaft; with an eccentric on the axle, an eccentric strap, a rod connected with said strap having its free end detachably connected to the arm on the rock shaft, and means whereby said rod may be disconnected from and held out of engagement with said arm.

13. In combination a carrier frame, a wheeled axle supporting the same, seeding boxes, a rock shaft and connections for operating said devices, a slotted arm on said rock shaft; with an eccentric loosely mounted on the axle, means for rotatably adjusting the eccentric on the axle, a clutch for locking the eccentric to the axle; an eccentric strap, a rod connected with said strap and having its free end detachably connected to the arm on the rock shaft, and means whereby said rod may be thrown out of engagement with said arm.

14. In combination a carrier frame, a wheeled axle supporting the same, a seeding frame, and means for relatively adjusting said frames; with seeding devices on the seeding frame, an eccentric mounted on the wheeled axle, connections between said eccentric and said seeding devices for operating the latter, and a foot lever and connections whereby the eccentric and seeding devices may be disconnected.

15. In combination a carrier frame, a wheeled axle supporting the same, a seeding frame, and means for relatively adjusting the frames, seeding devices on the seeding frame, a rock shaft mounted on said frame, connections for operating the seeding devices from said rock shaft; with an eccentric adjustably mounted on the axle, a rod connecting said eccentric and said rock shaft for operating the latter, and a lever whereby the said rod may be disengaged from said shaft.

16. In combination a carrier frame, a wheeled axle supporting the same, a seeding frame slidably connected with the carrier frame, and means for vertically adjusting the seeding frame relatively to the carrier frame; seeding devices on the seeding frame, an eccentric mounted on the axle, means for rotatably adjusting the eccentric on the axle, and means for locking the eccentric to the axle; and connections between said eccentric and said seeding devices for operating the latter.

17. In combination a carrier frame, a wheeled axle supporting the same, a seeding frame, and means for adjusting the latter frame relatively to the former; with seeding devices on the seeding frame, a rock shaft mounted on said frame, connections for operating the seeding devices from said rock shaft, and an arm on said rock shaft; an eccentric loosely mounted on the axle, means for rotatably adjusting the eccentric on the axle, and means for locking the eccentric to the axle, and connections between said eccentric and said arm on the rock shaft for operating the latter.

In testimony that we claim the foregoing as our own, we affix our signatures in presence of two witnesses.

FRANK R. FURBOS.
BERT T. LUMPKIN.

Witnesses:
MARCELLUS G. HOLSOPPLE,
DAN McCLEARY.